UNITED STATES PATENT OFFICE.

LOTHAR E. WEBER, OF BRIGHTON, MASSACHUSETTS.

PLASTIC COMPOSITION.

1,302,739.   Specification of Letters Patent.   Patented May 6, 1919.

No Drawing.   Application filed October 1, 1917.   Serial No. 194,243.

*To all whom it may concern:*

Be it known that I, LOTHAR E. WEBER, a subject of Great Britain, residing at Brighton, in the county of Suffolk and State of Massachusetts, have invented a new and useful Plastic Composition, of which the following is a specification.

This invention has reference to an improved plastic composition of a waterproof nature.

One object of the invention is to provide a plastic composition adapted to be spread on cloth or other fabric or material to render the same waterproof and adapt it to retain a large degree of flexibility.

Another object of the invention is to provide a composition of plastic matter of a waterproof nature which under ordinary conditions does not become brittle.

Other objects of the invention will appear from the following description.

The invention consists in the composition of matter as hereinafter set forth and claimed.

In carrying this invention into practice my object is to produce a doughy mass of a nature substantially waterproof which is adapted to retain to a large degree its plastic quality of being molded in various forms and of being spread out as a comparatively thin sheet, coating or layer without losing its flexible nature and becoming unduly brittle. To this end I make use of a basic material of a gelatinous nature preferably glue of which, in the specific embodiment of this invention herein referred to, I take five parts which I proceed to soften in five parts of water under the application of a moderate heat until a thick solution is produced thereby. To this solution I add approximately sixteen parts of sulfonated oil of a well known kind. For this purpose I find that sulfonated castor oil or sulfonated fish oil is satisfactory. I prefer however to make use of the sulfonated fish oil which I find mixes perfectly with the above mentioned solution containing the glue. The composition thus constituted is then cooled artificially or permitted to cool to the temperature of the atmosphere or to a lower temperature, if desired, after which I add a suitable hardening or curing agent, preferably a five per cent. (5%) solution of formaldehyde, ten parts of which is used, but I may make use of tannic acid, tannin, sodium or potassium bichromate as such hardening or curing agent.

When the formaldehyde or other hardening or curing agent is added to the solution or composition containing the glue and the sulfonated oil a pronounced thickening results which converts the mass into a dough. This dough is comparatively soft and workable by reason of the presence therein of the sulfonated oil. This mass of material is adhesive and water resisting and may be used as a water resisting filler or coating of any kind; it is, however, particularly useful as a water resisting or, so called, waterproofing coating or filler for woven, knitted or other fibrous material.

One particular use for the improved composition is in the waterproofing of woven material of cotton, wool or silk or a combination of the same. In this case I spread the doughy mass on the cloth or material as a comparatively thin coating or layer and preferably, in such spreading of the dough, subject the same to a suitable pressure to bring said dough into contact with said cloth or material. The pressure used will of course depend somewhat upon the consistency of the dough. By this means the cloth or material will be protected against moisture and the waterproofing or water resisting material will remain comparatively soft and flexible, as the hardening or curing agent is modified by the sulfonated oil constituting the softening or tempering agent.

In utilizing the improved composition of matter in combination with cloth to produce a waterproof structure I may and preferably will prepare two pieces of the cloth spread with the improved composition and bring the spread or coated surfaces together under a suitable pressure, thereby producing a structure having outer members of the cloth secured together by the improved composition.

It is usually desirable to drive off some part or all of the water used in preparing the gelatinous or glue solution and this may be accomplished at any time after the addition of the formaldehyde or other hardening or curing agent. When the doughy mass is to be applied to cloth or articles as above described, within a comparatively short time of the manufacture of this new composition, I prefer to defer the final step until after the application of the doughy mass to such cloth or article. This final step of the process consists in subjecting the doughy mass or articles to which the same has been applied to a temperature of approximately 65° C. and to continue such treatment for about one hour, more or less. This heating process tends to drive off the water, without unduly heating the dough, and assists the action of the formaldehyde.

When the improved composition of matter is intended for use as a filler for comparatively thick material or is to be applied to saturate material the proportions of water or sulfonated oil may be larger than that above named or the dough may be softened by the addition thereto of a suitable solvent.

Having thus described my invention I claim as new and desire to secure by Letters Patent.

1. The improved plastic composition comprising a solution of glue containing sulfonated fish oil and formaldehyde.

2. The improved plastic composition comprising approximately five parts of glue, five parts of water, sixteen parts of sulfonated oil and ten parts of formaldehyde in solution.

LOTHAR E. WEBER.